United States Patent
Nagaosa

(10) Patent No.: US 9,902,249 B2
(45) Date of Patent: Feb. 27, 2018

(54) ELECTRIC VEHICLE

(71) Applicant: TOYOTA JIDOSHA KABUSHIKI KAISHA, Toyota-shi, Aichi (JP)

(72) Inventor: Hideo Nagaosa, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/120,920

(22) PCT Filed: Jan. 14, 2015

(86) PCT No.: PCT/JP2015/050774
§ 371 (c)(1),
(2) Date: Aug. 23, 2016

(87) PCT Pub. No.: WO2015/129314
PCT Pub. Date: Sep. 3, 2015

(65) Prior Publication Data
US 2016/0368358 A1    Dec. 22, 2016

(30) Foreign Application Priority Data

Feb. 25, 2014    (JP) .................................. 2014-034544

(51) Int. Cl.
*B60K 1/04*    (2006.01)
*B60K 1/00*    (2006.01)
(Continued)

(52) U.S. Cl.
CPC .................. *B60K 1/00* (2013.01); *B60K 1/04* (2013.01); *B60K 8/00* (2013.01); *B60L 1/003* (2013.01);
(Continued)

(58) Field of Classification Search
CPC ........... B60K 1/04; B60K 1/0411; B60K 6/32
(Continued)

(56) References Cited

U.S. PATENT DOCUMENTS 5,193,635 A * 3/1993 Mizuno .................... B60K 1/04
180/65.25
6,378,637 B1 * 4/2002 Ono ........................ B60K 1/04
180/65.31
(Continued)

FOREIGN PATENT DOCUMENTS

JP    2003-072392 A    3/2003
JP    2003-173790 A    6/2003
(Continued)

*Primary Examiner* — Jeffrey J Restifo
(74) *Attorney, Agent, or Firm* — Andrews Kurth Kenyon LLP

(57) ABSTRACT

In order to secure a driving performance of an electric vehicle while stably supporting a fuel cell stack, a fuel cell stack generating electric power, a motor generator, and an electrical adjuster are accommodated in an accommodation compartment formed at a front side of a passenger compartment in a vehicle length direction. The electric motor and the electrical adjuster are housed in a common, bottom casing and the bottom casing is arranged at a bottom of the accommodation compartment. A stack support surface which is flat and extends in substantially a horizontal direction is formed at a top of the casing. The fuel cell stack is arranged above the casing and is supported by the casing through mounts arranged on the stack support surface.

4 Claims, 4 Drawing Sheets

(51) Int. Cl.
  *B60L 1/00* (2006.01)
  *B60L 3/00* (2006.01)
  *B60L 7/12* (2006.01)
  *B60L 11/18* (2006.01)
  *B60L 15/20* (2006.01)
  *B60K 8/00* (2006.01)

(52) U.S. Cl.
  CPC ............. B60L 3/0053 (2013.01); B60L 7/12 (2013.01); B60L 11/18 (2013.01); B60L 11/1805 (2013.01); B60L 11/1881 (2013.01); B60L 11/1887 (2013.01); B60L 11/1896 (2013.01); B60L 15/2009 (2013.01); *B60K 2001/0411* (2013.01); *B60L 2210/10* (2013.01); *B60L 2210/42* (2013.01); *B60L 2240/36* (2013.01); *B60L 2240/427* (2013.01); *B60L 2240/429* (2013.01); *H01M 2250/20* (2013.01); *Y02T 10/645* (2013.01); *Y02T 10/7216* (2013.01); *Y02T 10/7275* (2013.01); *Y02T 90/32* (2013.01); *Y02T 90/34* (2013.01)

(58) Field of Classification Search
  USPC .................................. 180/68.5, 291, 299
  See application file for complete search history.

(56) References Cited

U.S. PATENT DOCUMENTS

| | | | | |
|---|---|---|---|---|
| 6,648,085 B2* | 11/2003 | Nagura | ............... | B60K 1/00 180/65.1 |
| 7,222,692 B2* | 5/2007 | Masuda | ............... | B60K 1/00 180/291 |
| 8,459,385 B2* | 6/2013 | Katano | ............... | B60L 11/1892 180/65.22 |
| 8,607,909 B2* | 12/2013 | Ohashi | ............... | B60K 1/04 180/65.1 |
| 9,079,508 B2* | 7/2015 | Naito | ............... | B60K 1/04 |
| 2002/0100622 A1* | 8/2002 | Shimizu | ............... | B60K 1/00 180/65.1 |
| 2002/0189873 A1* | 12/2002 | Mizuno | ............... | B60K 1/04 180/65.31 |
| 2003/0042053 A1 | 3/2003 | Yoshikawa et al. | | |
| 2003/0108784 A1* | 6/2003 | Enjoji | ............... | H01M 8/02 429/434 |
| 2004/0090085 A1* | 5/2004 | Kawasaki | ............... | B60K 1/04 296/187.09 |
| 2007/0215397 A1* | 9/2007 | Suzuki | ............... | B60K 1/00 180/65.31 |
| 2008/0142289 A1* | 6/2008 | Yang | ............... | B60K 1/04 180/299 |
| 2010/0175933 A1 | 7/2010 | Yoshida | | |
| 2012/0031695 A1* | 2/2012 | Tsuchiya | ............... | B60K 1/04 180/68.5 |
| 2013/0301220 A1 | 11/2013 | Hotta et al. | | |
| 2013/0341114 A1* | 12/2013 | Ozawa | ............... | B60K 1/04 180/292 |
| 2014/0335434 A1* | 11/2014 | Ikeya | ............... | B60L 1/003 429/435 |
| 2014/0367182 A1* | 12/2014 | Yoshinaga | ............... | B60L 11/1898 180/68.4 |
| 2015/0027796 A1* | 1/2015 | Naito | ............... | B60K 1/04 180/65.31 |
| 2015/0107920 A1* | 4/2015 | Sakamoto | ............... | B60K 1/00 180/65.31 |
| 2016/0207386 A1* | 7/2016 | Nagaosa | ............... | B60K 1/00 |
| 2016/0297290 A1* | 10/2016 | Murata | ............... | B60K 1/04 |
| 2016/0368358 A1* | 12/2016 | Nagaosa | ............... | B60K 1/04 |

FOREIGN PATENT DOCUMENTS

| | | |
|---|---|---|
| JP | 2005-306079 A | 11/2005 |
| JP | 2007-245954 A | 9/2007 |
| JP | 2008-072813 A | 3/2008 |
| WO | 2005/100067 A1 | 10/2005 |
| WO | 2012/105353 A1 | 8/2012 |

* cited by examiner

ELECTRIC VEHICLE

CROSS-REFERENCE TO RELATED APPLICATIONS

This is a national phase application based on the PCT International Patent Application No. PCT/JP2015/050774 filed Jan. 14, 2015, claiming priority to Japanese Patent Application No. 2014-034544 filed Feb. 25, 2014, the entire contents of both of which are incorporated herein by reference.

TECHNICAL FIELD

The present invention relates to an electric vehicle.

BACKGROUND ART

An electric vehicle is known in the art, in which a fuel cell stack generating electric power and an electric motor for vehicle drive use driven by the electric power from the fuel cell stack are accommodated in an accommodation compartment formed at a front side of a passenger compartment in a vehicle length direction (see PLT 1). In this electric vehicle, the fuel cell stack is arranged above the electric motor.

CITATION LIST

Patent Literature

PLT 1. Japanese Patent Publication No. 2003-173790A

SUMMARY OF INVENTION

Technical Problem

PLT 1 does not specifically disclose how the fuel cell stack is supported. However, securing a driving performance of an electric vehicle while stably supporting a fuel cell stack is not always easy.

Solution to Problem

According to the present invention, there is provided an electric vehicle, in which a fuel cell stack generating electric power, an electric motor for vehicle drive use driven by the electric power from the fuel cell stack, and an electrical adjuster adjusting a voltage or current from the fuel cell stack or a voltage or current to the electric motor are accommodated in an accommodation compartment formed at an outside of a passenger compartment in a vehicle length direction, wherein the electric motor and the electrical adjuster are housed in a common casing and the casing is arranged at a bottom of the accommodation compartment, a stack support surface which is flat and extends in substantially a horizontal direction is formed at a top of the casing, and the fuel cell stack is arranged above the casing and is supported by the casing through mounts arranged on the stack support surface.

Advantageous Effects of Invention

It is possible to secure a driving performance of an electric vehicle while stably supporting a fuel cell stack.

DESCRIPTION OF EMBODIMENTS

Figure 1:
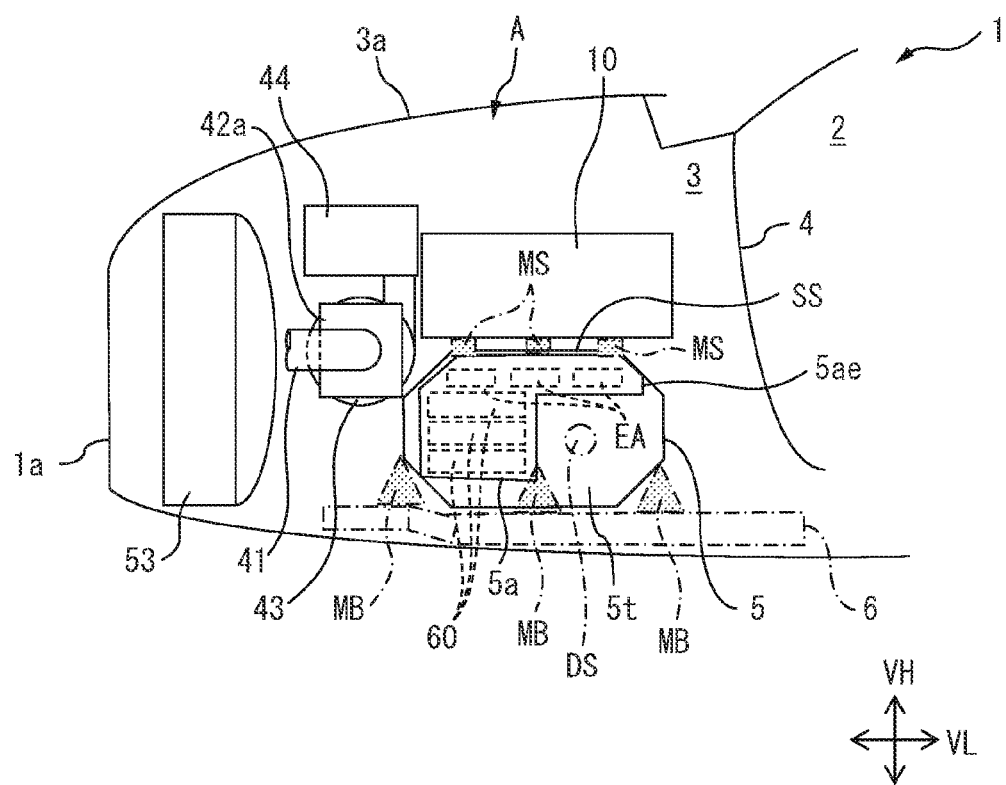
FIG. 1 is a schematic view seen from the side showing a layout of various elements inside an accommodation compartment of an electric vehicle.
Figure 2:
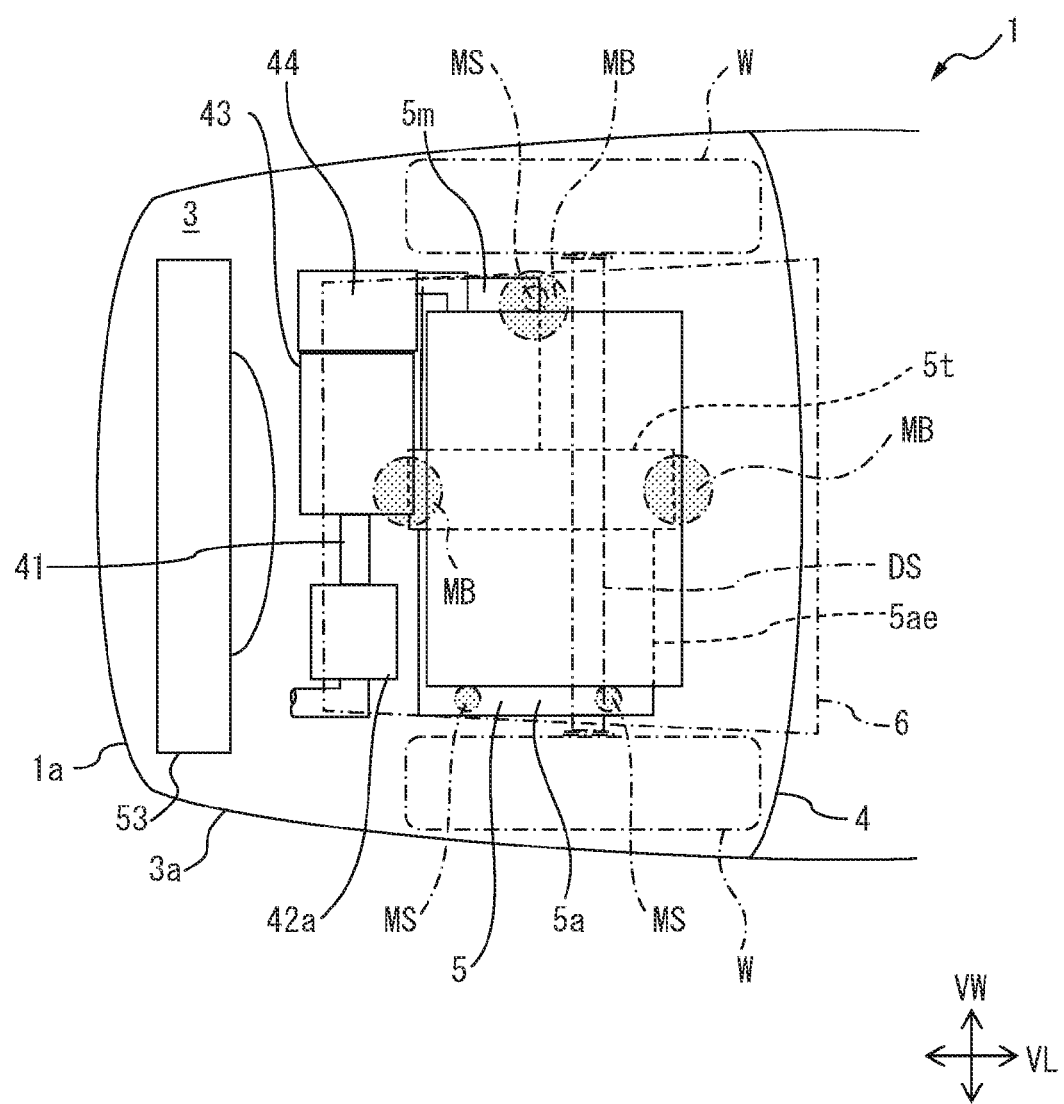
FIG. 2 is a schematic view seen from above showing a layout of various elements inside an accommodation compartment of an electric vehicle.
Figure 3:
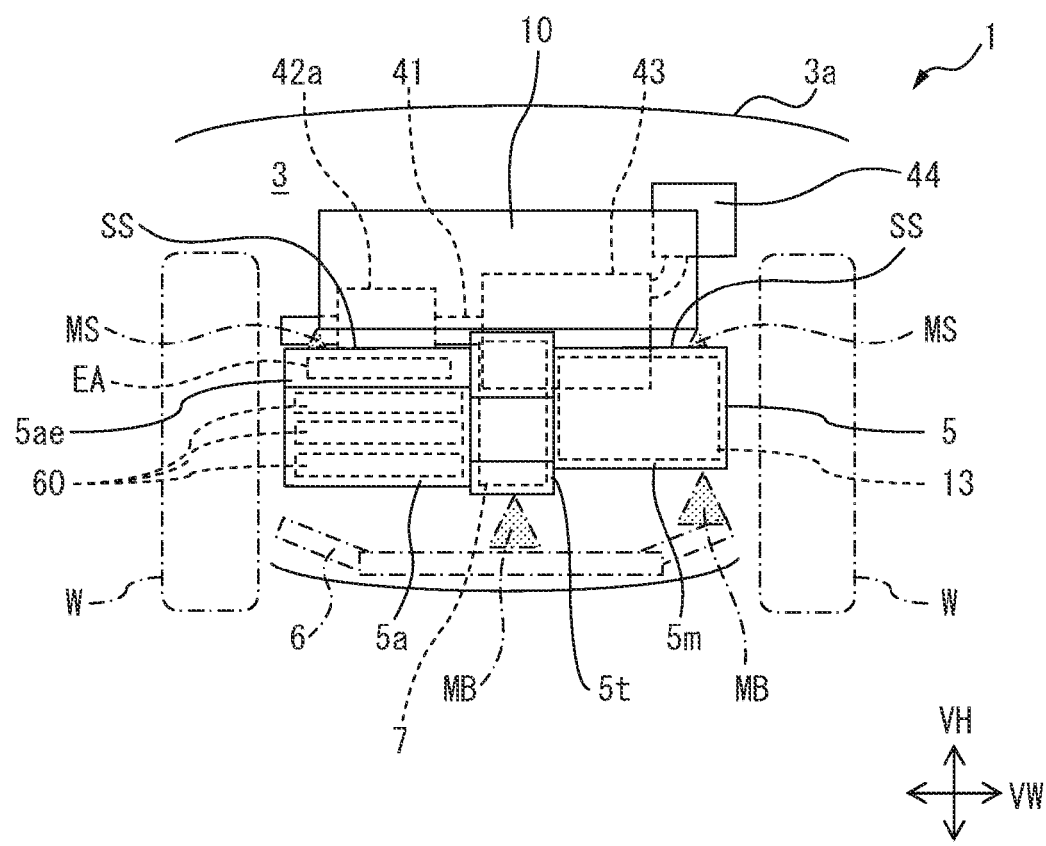
FIG. 3 is a schematic view seen from the rear showing a layout of various elements inside an accommodation compartment of an electric vehicle.
Figure 4:
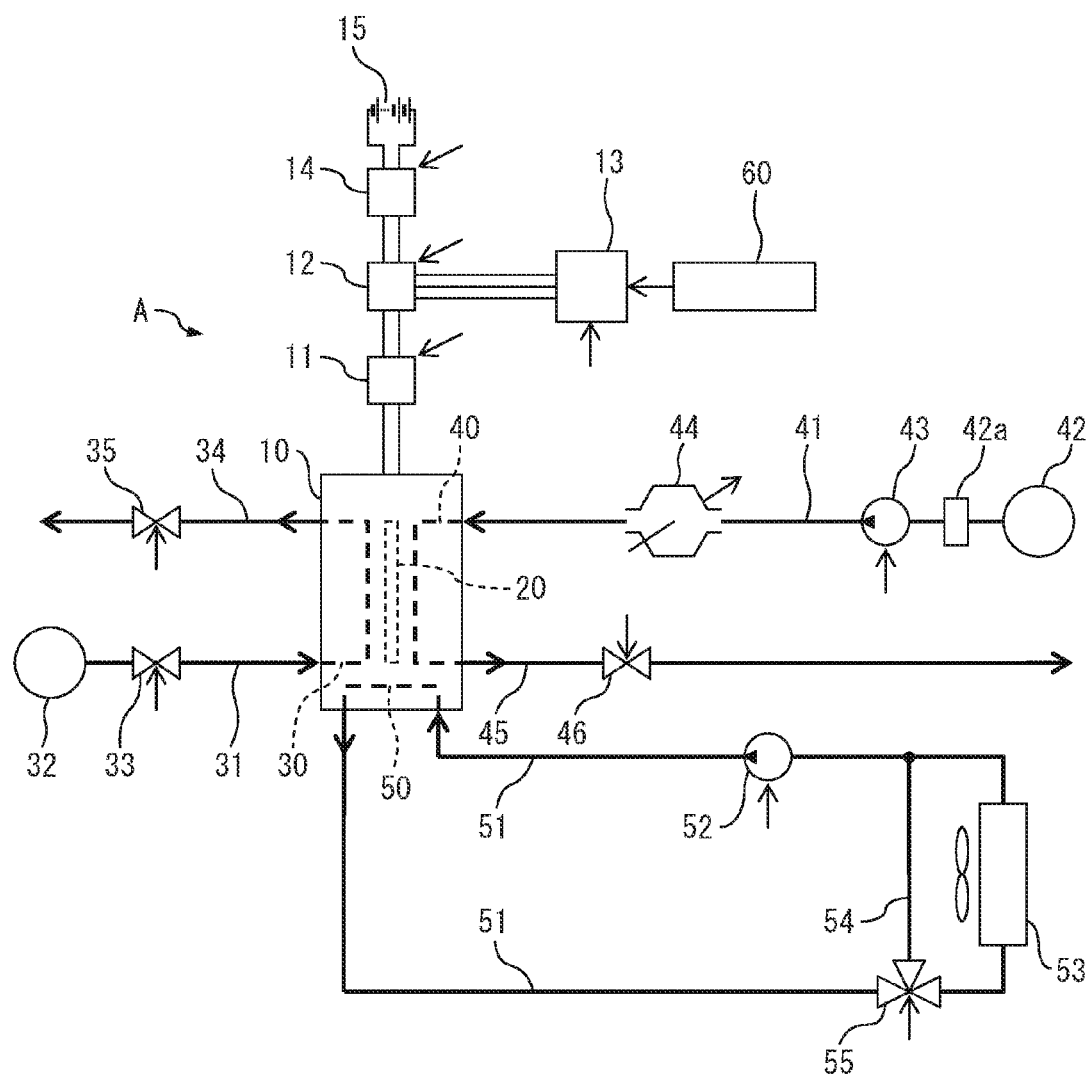
FIG. 4 is an overall view of a fuel cell system.

Referring to FIG. 1 to FIG. 3, an electric vehicle 1 is provided with a passenger compartment 2 and an accommodation compartment 3 formed at a front side of the passenger compartment 2 in a vehicle length direction VL. In the embodiment shown in the drawings, the accommodation compartment 3 is separated from the passenger compartment 2 by a dashboard 4. Alternatively, it may also be considered that the accommodation compartment 3 is defined by a hood 3a, vehicle body 3b, and dashboard 4. Note that, in FIG. 1 to FIG. 3, VL indicates the vehicle length direction, VW indicates a vehicle width direction, and VH indicates a vehicle height direction. Here, the vehicle length direction VL and vehicle width direction VW are horizontal directions, while the vehicle height direction VH is a vertical direction. On the other hand, the electric vehicle 1 is provided with a fuel cell system A such as shown in FIG. 4. One or all of the elements of the fuel cell system A are accommodated in the accommodation compartment 3.

Referring to FIG. 4, the fuel cell system A is provided with a fuel cell stack 10. The fuel cell stack 10 is provided with a plurality of unit fuel cells stacked on each other in a stacking direction. Each unit fuel cell includes a membrane electrode assembly 20. The membrane electrode assembly 20 is provided with a film-shaped electrolyte, an anode electrode formed at one side of the electrolyte, and a cathode electrode formed at the other side of the electrolyte. Further, at the inside of each unit fuel cell, a fuel gas delivery path for feeding fuel gas to the anode electrode, an oxidizing agent gas delivery path for feeding an oxidizing agent gas to the cathode electrode, and a coolant water delivery path for feeding coolant water to the unit fuel cell. By connecting the fuel gas delivery paths, oxidizing agent gas delivery paths, and coolant water delivery paths of the plurality of unit fuel cells in series, the fuel cell stack 10 is formed with a fuel gas passage 30, oxidizing agent gas passage 40, and coolant water passage 50.

At an inlet of the fuel gas passage 30, a fuel gas feed path 31 is coupled. The fuel gas feed path 31 is coupled with a fuel gas source 32. In the embodiment according to the present invention, the fuel gas is formed from hydrogen, while the fuel gas source 32 is formed from a hydrogen tank. Inside the fuel gas feed path 31, a fuel gas control valve 33 controlling an amount of fuel gas flowing through the inside of the fuel gas feed path 31 is arranged. On the other hand, at the outlet of the fuel gas passage 30, an anode off-gas passage 34 is coupled. When the fuel gas control valve 33 is opened, fuel gas inside the fuel gas source 32 is fed through the fuel gas feed path 31 to the inside of the fuel gas passage 30 in the fuel cell stack 10. At this time, a gas flowing out from the fuel gas passage 30, that is, an anode off-gas, flows into an anode off-gas passage 34. Inside the anode off-gas passage 34, an anode off-gas control valve 35 controlling an amount of anode off-gas flowing through the anode off-gas passage 34 is arranged.

Further, at an inlet of the oxidizing agent gas passage 40, an oxidizing agent gas feed path 41 is coupled. The oxidizing agent gas feed path 41 is coupled with an oxidizing agent gas source 42. In the embodiment according to the present invention, the oxidizing agent gas is formed from air, while the oxidizing agent gas source 42 is formed from the atmosphere. Inside the oxidizing agent gas feed path 41, an air cleaner 42a and an oxidizing agent gas feeder or compressor 43 feeding the oxidizing agent gas are successively arranged. Further, inside the oxidizing agent gas feed path 41 downstream of the compressor 43, an intercooler 44 is arranged for cooling the oxidizing agent gas sent from the compressor 43 to the fuel cell stack 10. In the embodiment according to the present invention, the intercooler 44 is comprised of an air-cooling type intercooler which has an air passage and cools the oxidizing agent gas by air flowing through the air passage. On the other hand, at an outlet of the oxidizing agent gas passage 40, a cathode off-gas passage 45 is coupled. If the compressor 43 is driven, the oxidizing agent gas in the oxidizing agent gas source 42 is fed through the oxidizing agent gas feed path 41 to the inside of the oxidizing agent gas passage 40 in the fuel cell stack 10. At this time, a gas flowing out from the oxidizing agent gas passage 40, that is, a cathode off-gas, flows into the cathode off-gas passage 45. Inside the cathode off-gas passage 45, a cathode off-gas control valve 46 controlling an amount of the cathode off-gas flowing through the inside of the cathode off-gas passage 45 is arranged.

Furthermore, referring to FIG. 4, at an inlet of the coolant water passage 50, one end of a coolant water feed path 51 is coupled, while at an outlet of the coolant water passage 50, the other end of the coolant water feed path 51 is coupled. Inside the coolant water feed path 51, a coolant water pump 52 pumping the coolant water and a radiator 53 are arranged. The coolant water feed path 51 upstream of the radiator 53 and the coolant water feed path 51 between the radiator 53 and the coolant water pump 52 are coupled with each other by a radiator bypass passage 54. Further, a radiator bypass control valve 55 controlling an amount of the cooling water flowing through the inside of the radiator bypass passage 54 is provided. In the fuel cell system A shown in FIG. 4, the radiator bypass control valve 55 is formed from a three-way valve and is arranged at an inlet of the radiator bypass passage 54. If the coolant water pump 52 is driven, the coolant water discharged from the coolant water pump 52 flows through the inside of the coolant water feed path 51 into the coolant water passage 50 inside the fuel cell stack 10, then flows through the coolant water passage 50 into the coolant water feed path 51 and returns through the radiator 53 or radiator bypass passage 54 to the coolant water pump 52.

Further, the anode electrodes and cathode electrodes of the unit fuel cells are respectively electrically connected in series to form electrodes of the fuel cell stack 10. The electrodes of the fuel cell stack 10, as shown in FIG. 4, are electrically connected to a DC/DC converter 11. The DC/DC converter 11 is on the one hand electrically connected through an inverter 12 to the motor generator 13, while on the other hand is electrically connected through a DC/DC converter 14 to an electricity storage device 15. The DC/DC converter 11 is for increasing a voltage from the fuel cell stack 10 and sending it to the inverter 12, while the inverter 12 is for converting a DC current from the DC/DC converter 11 to AC current. The DC/DC converter 14 is for lowering a voltage from the fuel cell stack 10 or motor generator 13 or for increasing a voltage to the motor generator 13. Note that, in the fuel cell system A shown in FIG. 4, the electricity storage device 15 is comprised of a battery.

Furthermore, the fuel cell system A is provided with a control unit 60 including a computer. The control unit 60 is connected to the motor generator 13, control valve 33, etc. The motor generator 13 etc. are controlled based on signals from the control unit 60.

When power is to be generated using the fuel cell stack 10, the fuel gas control valve 33 is opened and fuel gas is fed to the fuel cell stack 10. Further, the compressor 43 is driven, and oxidizing agent gas is discharged from the compressor 43. This oxidizing agent gas is next sent to the intercooler 44 to be cooled and then is fed to the fuel cell stack 10. As a result, in the unit fuel cells, an electrochemical reaction occurs and electrical energy is generated. This generated electrical energy is sent to the motor generator 13. As a result, the motor generator 13 is operated as an electric motor for vehicle drive use to drive the vehicle. Alternatively, the electrical energy generated at the fuel cell stack 10 is sent to the electricity storage device 15 and is stored therein. On the other hand, for example, at the time of vehicle braking, the motor generator 13 operates as a regeneration device. An electric energy regenerated at this time is stored in the electricity storage device 15.

Here, the intercooler 44 of the embodiment shown in the drawings will be briefly explained. The intercooler 44 is comprised of a casing, an oxidizing agent gas passage through which the oxidizing agent gas flows, and an air passage through which the air flows. The oxidizing agent gas passage communicates with the above-mentioned oxidizing agent gas feed path 41. On the other hand, an air passage is defined by a partition arranged in the casing. This partition forms a honeycomb structure. Further, the partition extends in the length direction from an air inlet to an air outlet, The air inlet and air outlet communicate with the accommodation compartment 3. The above-mentioned oxidizing agent gas pipe extends passing through partition. If air is introduced into the air inlet, this air flows through the inside of the air passage, therefore the oxidizing agent gas flowing through the oxidizing agent gas passage is cooled by the air.

Referring again to FIG. 1 to FIG. 3, a bottom casing 5 is accommodated at a bottom of the accommodation compartment 3. The bottom casing 5 has a transaxle housing part 5t, a motor housing part 5m provided at one side of the transaxle housing part 5t, and an adjuster housing part 5a provided at the other side of the transaxle housing part 5t. These transaxle housing part 5t, motor housing part 5m, and adjuster housing part 5a are integrally formed. The transaxle housing part 5t houses the transaxle 7 therein, while the motor housing part 5m houses the above-mentioned motor generator 13 therein. Further, the adjuster housing part 5a houses an electrical adjuster EA, which will be explained later. An input/output shaft of the motor generator 13 is coupled through the above-mentioned transaxle 7 to a front drive shaft DS. The drive shaft DS of the electric vehicle 1 passes through the transaxle housing part 5t and extends in the vehicle width direction VW. At the two ends of the front drive shaft DS, wheels W are attached. In particular, as shown in FIG. 2 and FIG. 3, the transaxle housing part 5t is arranged substantially along the vehicle length direction VL, at the substantial center of the accommodation compartment 3 in the vehicle width direction VW. Therefore, the motor housing part 5m is positioned at one side of the transaxle housing part 5t in the vehicle width direction VW, while the adjuster housing part 5a is positioned at the other side of the transaxle housing part 5t in the vehicle width direction VW. In this case, the bottom casing 5 is, for example, supported through rubber bottom mounts MB by suspension members 6. In the embodiment shown in the drawings, the bottom mounts MB are arranged at three locations: two positions are below the transaxle housing part 5t and separated from each other in the vehicle length direction VL and one position is below the motor housing part 5m.

The electrical adjuster EA adjusts a voltage or current from the fuel cell stack 10 or a voltage or current to the motor generator 13. In the embodiment shown in the drawings, the electrical adjuster EA is comprised of a DC/DC converter 11, inverter 12, and DC/DC converter 14. In another embodiment, the electrical adjuster EA is comprised of at least one of a DC/DC converter 11, inverter 12, and DC/DC converter 14.

In particular, as shown in FIG. 1, the adjuster housing part 5a has an extending part 5ae extending above the drive shaft DS in the vehicle height direction VH in substantially the horizontal direction. The above-mentioned electrical adjuster EA is housed in this extending part 5ae. Furthermore, in the embodiment shown in the figure, the above-mentioned control unit 60 is housed in the adjuster housing part 5a below the electrical adjuster EA.

Furthermore, at a top of the bottom casing 5, a stack support surface SS which is flat and extends in substantially the horizontal direction is formed. In the embodiment shown in the drawings, the stack support surface SS is formed at a top of the motor housing part 5m and a top of the adjuster housing part 5a. In this case, the stack support surface SS is formed at a top of the extending part 5ae as well. In another embodiment, the stack support surface SS is formed at least at two of the top of the transaxle housing part 5t, the top of the motor housing part 5m, and the top of the adjuster housing part 5a.

Above the bottom casing 5 in the vehicle height direction VH, the above-mentioned fuel cell stack 10 is arranged. In this case, the fuel cell stack 10 is supported by the bottom casing 5 through stack mounts MS of, for example, rubber, arranged on the stack support surface SS. In the embodiment shown in the drawings, stack mounts MS are arranged at three locations: one position is on the top surface of the motor housing part 5m and two positions are on the top surface of the adjuster housing part 5a and separated from each other in the vehicle length direction VL. Further, the fuel cell stack 10 is arranged so that a length direction of the fuel cell stack 10 is oriented in the vehicle width direction VW and a width direction of the fuel cell stack 10 is oriented in the vehicle length direction VL. In this case, as will be particularly understood from FIG. 2 and FIG. 3, the fuel cell stack 10 is arranged at the substantially center in the vehicle width direction VW. Note that, in the embodiment shown in the drawings, the length direction of the fuel cell stack 10 matches the stacking direction of the unit fuel cells.

Further, at the front side of the fuel cell stack 10 in the vehicle length direction VL, in addition to the intercooler 44, the above-mentioned compressor 43 and air cleaner 42a are arranged. These compressor 43 and air cleaner 42a are arranged side by side in the vehicle width direction VW. At the air inlet of the air cleaner 42a, an air duct (not shown) is provided. Furthermore, at the front side of the intercooler 44, compressor 43, and air cleaner 42a in the vehicle length direction VL, the radiator 53 is arranged.

Note that, FIGS. 1 to 3 are schematic views. For example, in FIG. 3, illustration of the drive shaft DS is omitted.

Now, in the above-mentioned embodiment according to the present invention, the motor generator 13 having a relatively large weight is arranged at the bottom of the accommodation compartment 3, while the fuel cell stack 10 is directly supported by the bottom casing 5, so the center of gravity of the vehicle 1 is made lower in height. As a result, a drive performance or stability of the vehicle 1 are improved. Simultaneously, the fuel cell stack 10 is supported on the stack support surface SS extending in substantially the horizontal direction, so the fuel cell stack 10 is stably supported. Further, the fuel cell stack 10 is supported through the stack mounts MS by the bottom casing 5, so no special constitution is required for supporting the fuel cell stack 10. Further, attachment of the fuel cell stack 10 is facilitated.

Further, the stack support surface SS is flat, so a clearance between the fuel cell stack 10 and the bottom casing 5 is made smaller. Therefore, the accommodation compartment 3 can be effectively utilized.

Furthermore, at the bottom casing 5, the extending part 5ae extending above the drive shaft DS in the vehicle height direction VH is provided and the electrical adjuster EA is housed in this extending part 5ae. Therefore, the accommodation compartment 3 can be utilized more effectively.

In another embodiment according to the present invention, the accommodation compartment 3 is formed at a rear side of the passenger compartment 2 in the vehicle length direction VL. Therefore, in the present invention, the accommodation compartment 3 is formed at an outside of the passenger compartment 2 in the vehicle length direction VL.

In still another embodiment according to the present invention, the intercooler 44 is comprised of a water-cooled type intercooler. That is, the above-mentioned air passage comprises a coolant water passage. A coolant water inlet and coolant water outlet of the coolant water passage are connected to the above-mentioned coolant water feed path 51, whereby coolant water flows through the inside of the coolant water passage.

The present application claims the benefit of Japanese Patent Application No. 2014-034544, the entire disclosure of which is incorporated herein by reference.

REFERENCE SIGNS LIST 1. electric vehicle
2. passenger compartment
3. accommodation compartment
5. bottom casing
10. fuel cell stack
13. motor generator
EA. electrical adjuster
SS. stack support surface

The invention claimed is:

1. An electric vehicle, in which a fuel cell stack generating electric power, an electric motor for vehicle drive use driven by the electric power from the fuel cell stack, and an electrical adjuster adjusting a voltage or current from the fuel cell stack or a voltage or current to the electric motor are accommodated in an accommodation compartment formed at an outside of a passenger compartment in a vehicle length direction, wherein
   the electric motor and the electrical adjuster are housed in a common casing and the casing is arranged at a bottom of the accommodation compartment,
   a stack support surface which is flat and extends in substantially a horizontal direction is formed at a top of the casing, and the fuel cell stack is arranged above the casing and is supported by the casing through mounts arranged on the stack support surface.

2. The electric vehicle according to claim 1, wherein a transaxle of the electric vehicle is also accommodated inside the casing, the casing is provided with a transaxle housing part housing the transaxle, a motor housing part housing the electric motor, and an adjuster housing part housing the electrical adjuster, the transaxle housing part is arranged at the substantial center of the accommodation compartment in a vehicle width direction, the motor housing part is arranged at one side of the transaxle housing part in the vehicle width direction, the adjuster housing part is arranged at the other side of the transaxle housing part in the vehicle width direction, and the stack support surface is formed at a top of the motor housing part and a top of the adjuster housing part.

3. The electric vehicle according to claim 2, wherein the electric vehicle has a drive shaft passing through the casing and extending through the inside of the accommodation compartment in the vehicle width direction, the adjuster housing part includes an extended part extending above the drive shaft in a substantially horizontal direction, and the stack support surface is formed at a top of the extending part.

4. The electric vehicle according to claim 1, wherein the electrical adjuster includes one or both of a converter for increasing a voltage generated by the fuel cell stack and an inverter for converting DC current generated at the fuel cell stack to AC current.

\* \* \* \* \*